United States Patent
Anwani et al.

(10) Patent No.: US 12,101,144 B2
(45) Date of Patent: Sep. 24, 2024

(54) EXPLORATION OF INACTIVE RANKS OR INACTIVE PRECODERS

(71) Applicant: QUALCOMM Incorporated, San Diego, CA (US)

(72) Inventors: Navin Dunichand Anwani, Gondia (IN); Supratik Bhattacharjee, San Diego, CA (US); Pouriya Sadeghi, San Diego, CA (US); Sanaz Barghi, Carlsbad, CA (US); Gautham Hariharan, Sunnyvale, CA (US); Ashutosh Vinod Agrawal, Bengaluru (IN); Alexandre Pierrot, San Diego, CA (US); Ali Koochakzadeh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 17/648,590

(22) Filed: Jan. 21, 2022

(65) Prior Publication Data
US 2023/0239016 A1    Jul. 27, 2023

(51) Int. Cl.
*H04B 7/02* (2018.01)
*H04B 7/0417* (2017.01)
*H04B 7/0456* (2017.01)

(52) U.S. Cl.
CPC ......... *H04B 7/0486* (2013.01); *H04B 7/0417* (2013.01)

(58) Field of Classification Search
CPC ............................. H04B 7/0486; H04B 7/0417
USPC ................ 375/267, 260, 259, 219, 296, 316
See application file for complete search history.

(56) References Cited

U.S. PATENT DOCUMENTS

| | | |
|---|---|---|
| 2015/0288435 A1 | 10/2015 | Nammi |
| 2018/0262242 A1 | 9/2018 | Chakraborty et al. |
| 2020/0274598 A1* | 8/2020 | Hao ...................... H04W 24/10 |
| 2023/0318676 A1* | 10/2023 | Matsumura ........... H04W 24/10 370/329 |

FOREIGN PATENT DOCUMENTS

WO    2021247903    12/2021

OTHER PUBLICATIONS

International Search Report and Written Opinion—PCT/US2023/061026—ISA/EPO—Apr. 25, 2023.

* cited by examiner

*Primary Examiner* — Zewdu A Kassa
(74) *Attorney, Agent, or Firm* — Harrity & Harrity, LLP

(57) ABSTRACT

Various aspects of the present disclosure generally relate to wireless communication. In some aspects, a user equipment (UE) may receive a signal. The UE may measure the signal to explore one or more inactive ranks or inactive precoders. The UE may transmit, based at least in part on the measuring, a report that includes channel state information for at least one of the one or more inactive ranks or inactive precoders. Numerous other aspects are described.

29 Claims, 9 Drawing Sheets

EXPLORATION OF INACTIVE RANKS OR INACTIVE PRECODERS

FIELD OF THE DISCLOSURE

Aspects of the present disclosure generally relate to wireless communication and to techniques and apparatuses for exploring inactive ranks or precoders.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a signal. The method may include measuring the signal to explore one or more inactive ranks or inactive precoders. The method may include transmitting, based at least in part on the measuring, a report that includes channel state information (CSI) for at least one of the one or more inactive ranks or inactive precoders.

Some aspects described herein relate to a method of wireless communication performed by a base station. The method may include transmitting a signal to a UE. The method may include receiving a report that includes CSI for one or more inactive ranks or inactive precoders.

Some aspects described herein relate to a method of wireless communication performed by a base station. The method may include receiving a signal from a UE. The method may include measuring the signal to explore one or more inactive ranks or precoders. The method may include transmitting, based at least in part on a measurement of the signal, a grant or an indication to switch to a new rank or a new precoder of the one or more inactive ranks or inactive precoders.

Some aspects described herein relate to a UE for wireless communication. The UE may include a memory and one or more processors coupled to the memory. The one or more processors may be configured to receive a signal. The one or more processors may be configured to measure the signal to explore one or more inactive ranks or inactive precoders. The one or more processors may be configured to transmit, based at least in part on the measuring, a report that includes CSI of at least one of the one or more inactive ranks or inactive precoders.

Some aspects described herein relate to a base station for wireless communication. The base station may include a memory and one or more processors coupled to the memory. The one or more processors may be configured to transmit a signal to a UE. The one or more processors may be configured to receive a report that includes CSI for one or more inactive ranks or inactive precoders.

Some aspects described herein relate to a base station for wireless communication. The base station may include a memory and one or more processors coupled to the memory. The one or more processors may be configured to receive a signal from a UE. The one or more processors may be configured to measure the signal to explore one or more inactive ranks or precoders. The one or more processors may be configured to transmit, based at least in part on a measurement of the signal, a grant or an indication to switch to a new rank or a new precoder of the one or more inactive ranks or inactive precoders.

Some aspects described herein relate to a non-transitory computer-readable medium that stores a set of instructions for wireless communication by a UE. The set of instructions, when executed by one or more processors of the UE, may cause the UE to receive a signal. The set of instructions, when executed by one or more processors of the UE, may cause the UE to measure the signal to explore one or more inactive ranks or inactive precoders. The set of instructions, when executed by one or more processors of the UE, may cause the UE to transmit, based at least in part on the measuring, a report that includes CSI for at least one of the one or more inactive ranks or inactive precoders.

Some aspects described herein relate to a non-transitory computer-readable medium that stores a set of instructions for wireless communication by a base station. The set of instructions, when executed by one or more processors of the base station, may cause the base station to transmit a signal to a UE. The set of instructions, when executed by one or more processors of the base station, may cause the base station to receive a report that includes CSI for one or more inactive ranks or inactive precoders.

Some aspects described herein relate to a non-transitory computer-readable medium that stores a set of instructions for wireless communication by a base station. The set of instructions, when executed by one or more processors of the base station, may cause the base station to receive a signal from a UE. The set of instructions, when executed by one or more processors of the base station, may cause the base station to measure the signal to explore one or more inactive ranks or precoders. The set of instructions, when executed by one or more processors of the base station, may cause the base station to transmit, based at least in part on a measurement of the signal, a grant or an indication to switch to a new rank or a new precoder of the one or more inactive ranks or inactive precoders.

Some aspects described herein relate to an apparatus for wireless communication. The apparatus may include means for receiving a signal. The apparatus may include means for measuring the signal to explore one or more inactive ranks or inactive precoders. The apparatus may include means for transmitting, based at least in part on the measuring, a report that includes CSI for at least one of the one or more inactive ranks or inactive precoders.

Some aspects described herein relate to an apparatus for wireless communication. The apparatus may include means for transmitting a signal to a UE. The apparatus may include means for receiving a report that includes CSI for one or more inactive ranks or inactive precoders.

Some aspects described herein relate to an apparatus for wireless communication. The apparatus may include means for receiving a signal from a UE. The apparatus may include means for measuring the signal to explore one or more inactive ranks or precoders. The apparatus may include means for transmitting, based at least in part on a measurement of the signal, a grant or an indication to switch to a new rank or a new precoder of the one or more inactive ranks or inactive precoders.

Aspects generally include a method, apparatus, system, computer program product, non-transitory computer-readable medium, UE, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
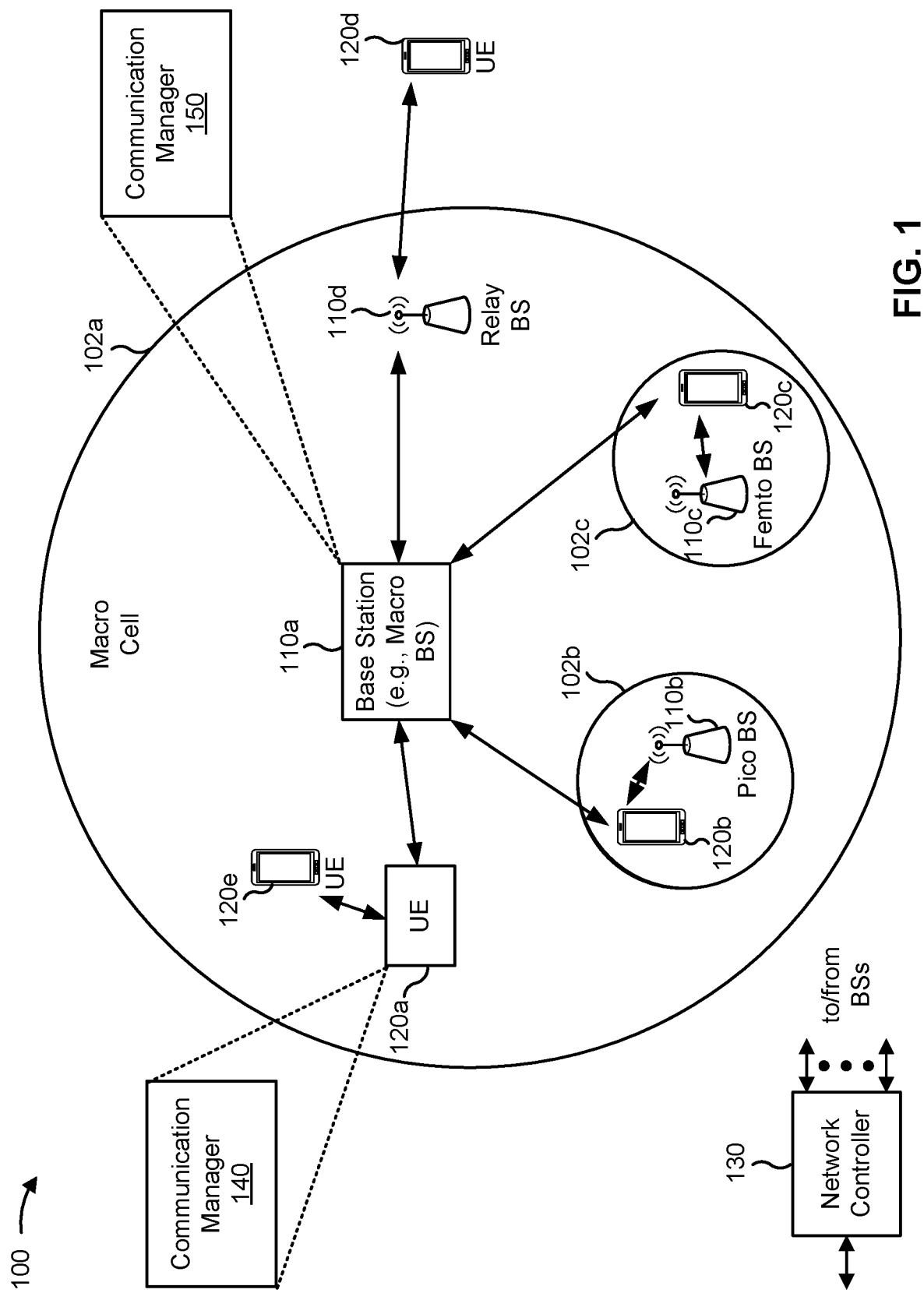
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a signal; measure the signal to explore one or more inactive ranks or inactive precoders. The communication manager 140 may transmit, based at least in part on the measuring, a report that includes channel state information (CSI) for at least one of the one or more inactive ranks or inactive precoders. Additionally, or alternatively, the communication manager 140 may perform one or more other operations described herein.

In some aspects, the base station 110 may include a communication manager 150. As described in more detail elsewhere herein, the communication manager 150 may transmit a signal to a UE. The communication manager 150 may receive a report that includes CSI for one or more inactive ranks or inactive precoders.

In some aspects, the communication manager 150 may receive a signal from a UE and measure the signal to explore one or more inactive ranks or precoders. The communication manager 150 may transmit, based at least in part on a measurement of the signal, a grant or an indication to switch to a new rank or a new precoder of the one or more inactive ranks or inactive precoders. Additionally, or alternatively, the communication manager 150 may perform one or more other operations described herein.

As indicated above, FIG. 1 is provided as an example. Other examples may differ from what is described with regard to FIG. 1.

Figure 2:
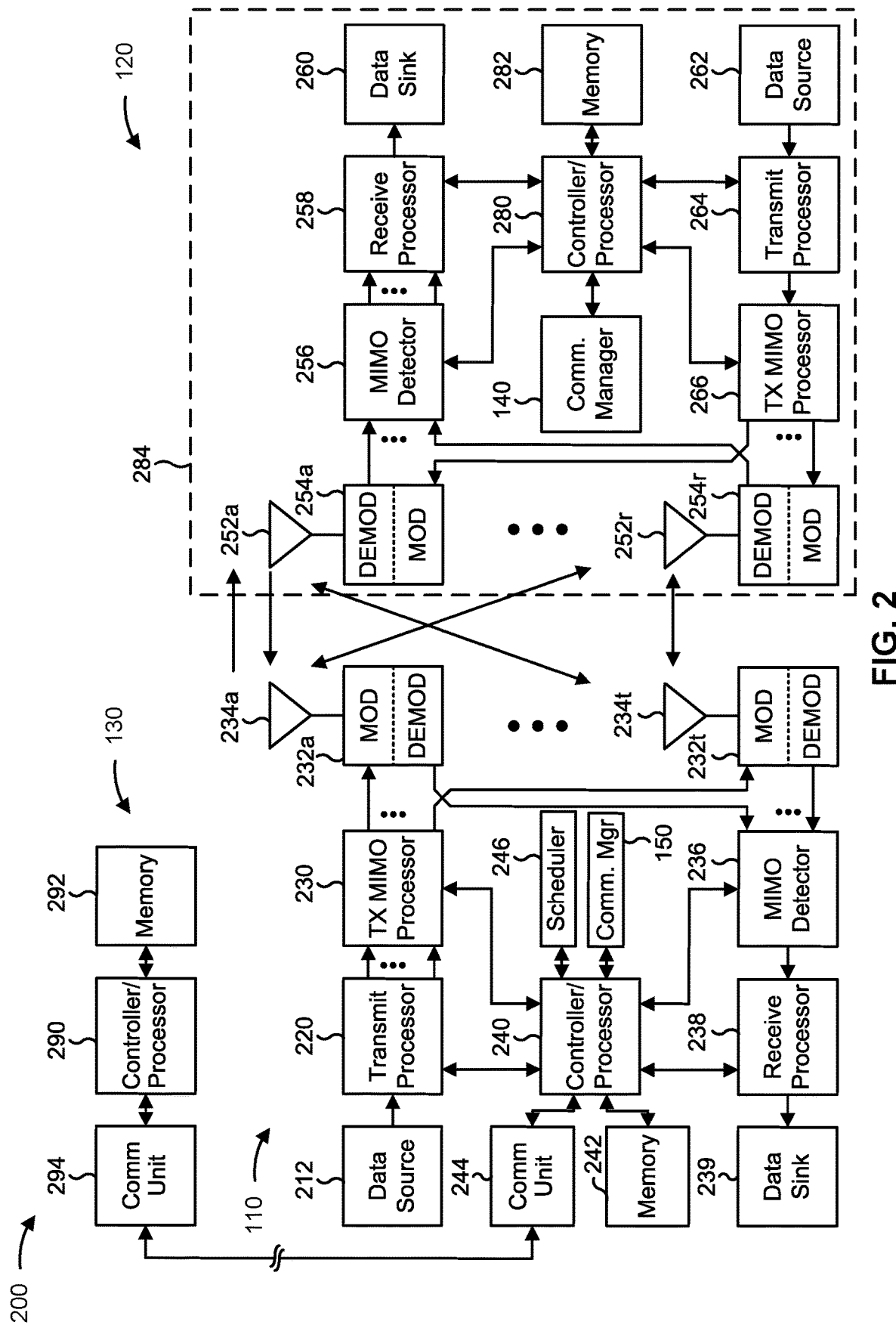
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with exploring inactive ranks or precoders, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving a signal; means for measuring the signal to explore one or more inactive ranks or inactive precoders; and/or means for transmitting, based at least in part on the measuring, a report that includes CSI for at least one of the one or more inactive ranks or inactive precoders. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a signal to a UE; and/or means for receiving a report that includes CSI for f one or more inactive ranks or inactive precoders. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station 110 includes means for receiving a signal from a UE; means for measuring the signal to explore one or more inactive ranks or precoders; and/or means for transmitting, based at least in part on a measurement of the signal, a grant or an indication to switch to a new rank or a new precoder of the one or more inactive ranks or inactive precoders.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
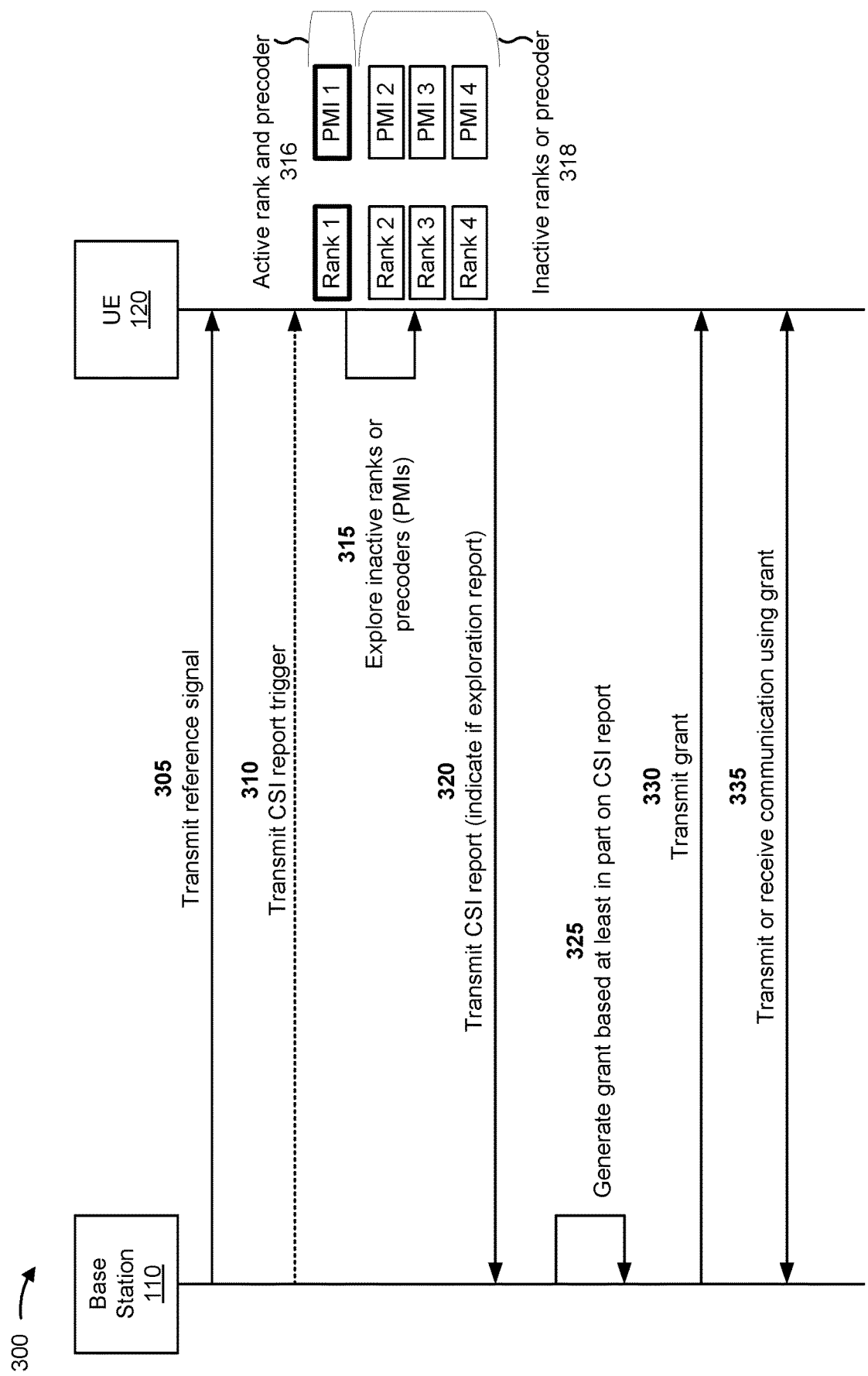
FIG. 3 is a diagram illustrating an example of channel state information (CSI) reporting, in accordance with the present disclosure.

FIG. 3 is a diagram illustrating an example 300 of CSI reporting, in accordance with the present disclosure. As shown in FIG. 3, a base station 110 and a UE 120 may communicate with one another.

A UE may measure signals on a channel and provide CSI to a base station (e.g., eNB, gNB). The CSI may indicate properties of the channel that affect how a transmitted signal is received. The base station may use the CSI to optimize downlink spectral efficiency through spatial multiplexing (transmitting independent channels separated in space), precoding, and rate adaptation (adjusting a bit rate of transmission). Precoding involves preprocessing a transmit signal to maximize reception at the receiver. The base station may use the CSI to set the precoding for a transmit signal. The precoding may be used to control amplitudes, phases, and/or spatial mapping of the transmit antennas. Accurate CSI helps to improve performance and increase spectral efficiency.

To conserve CSI reporting overhead, the base station may employ the use of a wideband CSI report to report CSI for a wider spectrum. However, there are challenges to determining accurate wideband CSI. Interference can differ between data and a CSI reference signal (CSI-RS) if the base station shares spectrum with a non-colliding, unloaded LTE neighbor. Other challenges may include frequency selective fading (different code blocks undergo different fades), complexity constraints on computations (e.g., tight CSI reporting timeline, supporting multiple CSI processes at the same time), and/or applying the solution to unseen channels.

A transmitter may transmit a signal with a given rank, which may correspond to a number of layers in a data stream of the signal. A base station may transmit an uplink grant to a UE that indicates the rank that the UE is to use. The uplink grant may also indicate a precoding matrix indicator (PMI), which indicates which precoding matrix (precoder) that the UE is to use for transmission. The precoding matrix identifies weights that are to be applied during the precoding process.

The base station may adapt or change the rank or precoder. However, if the base station does not change the rank or precoder (grant a different rank or indicate a different PMI), the rank or precoder may become stale. In other words, the rank or precoder may stabilize at a lower than ideal value despite being adaptable while actively transmitting (online adaptation). For example, there may be a 10-15% throughput loss with a stale rank compared to a best fixed rank, whether at 0 decibels (dB), 8 dB, or 14 dB. Throughput loss wastes the processing resources and the signaling resources of the UE and the base station.

According to various aspects described herein, a UE may measure a signal (with a given rank or precoder) to explore other eligible ranks or precoders—ranks or precoders that are inactive or have been inactive in recent past. Inactivity may include a threshold time duration for which a corresponding grant with the rank or precoder has not been transmitted (downlink) or received (uplink). The UE may transmit an exploration report to the base station for the explored ranks or precoders. The exploration report may be transmitted with or separate from a regular CSI report (with an indication that a CSI report is an exploration report). In some aspects, the CSI may be for a rank than can be a suboptimal rank or a precoder that can be a suboptimal precoder. Suboptimal may refer to a rank or a precoder that has a measurement value that is less than ideal or maximum expected measurement value for a rank or a precoder. Suboptimal may also refer to ranks or precoders that have measurement values that are below a threshold. However, suboptimal ranks or precoders may have measurement values that are still greater than a measurement value for a stale rank or precoder. The indication for the exploration report may help the higher layers of the base station to refrain from reacting adversely to the exploration report and help the outer loop link adaptation of the base station to refrain from carrying over an adjustment for an explored rank or precoder to other ranks or precoders if a cyclic redundancy check (CRC) fails for the explored rank or precoder.

By providing an exploration report for inactive ranks or precoders, the base station may keep CSI adjustments up to date for all eligible ranks or precoders and thus the CSI may be optimal. As a result, an average spectral efficiency for communications may cause the network to be more efficient and increase the throughput. Increased throughput conserves the processing resources and the signaling resources of the UE and the base station.

For example, if a UE is initially reporting a suboptimal rank 2, the UE may explore long-inactive ranks with a specified periodicity. The UE may detect that the optimal rank is actually rank 4 and thus switches to rank 4. The UE may keep exploring other ranks, with a specified periodicity, to keep track of changes to the channel. This exploration may cause CSI adaptation to better track an optimal fixed rank envelope.

In some aspects, the base station may assist the UE with rank or precoder exploration by providing the UE an opportunity (e.g., time-frequency resource, aperiodic CSI reporting grant) for transmitting the exploration report. By controlling a duration of exploration and/or a frequency of the exploration reports (e.g., controlling a minimum duration between reports), the base station may lessen any adverse effects on the scheduling by the base station.

In some aspects, the base station may reduce a duration or frequency of exploration if an explored rank or precoder happens to be suboptimal. In addition, the UE may transmit a separate fallback CSI report along with the exploration report. The base station 110 may also fall back to a previous CSI report. The base station 110 may transmit an indication for the UE 120 to provide the separate fallback CSI report.

Example 300 shows a UE 120 that signals to a base station that a CSI report is an exploration report. The UE 120 may trigger exploration of certain long-inactive ranks or precoders to calibrate CSI computation or adaptation.

As shown by reference number 305, the base station 110 may transmit a reference signal (e.g., CSI-RS) to the UE 120. In some aspects, the base station 110 may determine when inactive ranks or precoders are to be explored. As shown by reference number 310, the base station 110 may optionally transmit a CSI report trigger for an exploration report. The base station 110 may also trigger exploration of inactive ranks or precoders by providing an opportunity for the UE 120 to report an exploration report.

As shown by reference number 315, the UE 120 may explore inactive ranks or precoders. That is, while the UE 120 may measure the reference signal for an expected active rank (indicated by rank indicator (RI)) or an expected precoder (indicated by a PMI), shown by active rank and precoder 316, the UE 120 may measure the reference signal to explore inactive ranks or precoders 318. The UE 120 may identify a particular rank from eigenvalues (energy measurements) of a signal. For example, the UE 120 may measure the reference signal for $\lambda_1$ (eigenvalue for the first layer/rank of the reference signal), $\lambda_2$ (eigenvalue for the second layer/rank of the reference signal), up to $\lambda_i$ (the i-th largest singular value or eigenvalue) for inactive ranks. Likewise, the UE 120 may measure the reference signal trying different inactive precoders.

As shown by reference number 320, the UE 120 may include information about explored inactive ranks or precoders in a CSI report that is indicated to be an exploration report. The information may be included if a measurement for an inactive rank or precoder satisfies a threshold (e.g., RSRP difference threshold, dB difference threshold). For example, if a measurement (in dB) for an inactive rank or precoder is greater than a minimum dB difference over a measurement for an active rank or precoder, the UE 120 may select the inactive rank or precoder for reporting and provide information identifying the inactive rank (RI) or precoder (PMI) to the base station 110. The selected inactive rank or precoder may be suboptimal (e.g., measurement is less than expected or not the greatest value) or may not have been selected for use in the recent past (e.g., last use was more than a threshold time duration in the past). The information may include an indication of the measurement of the inactive rank or precoder and/or the difference between the measurement for the inactive rank or precoder and the measurement for the active rank or precoder.

As shown by reference number 325, the base station 110 may generate a grant based at least in part on the CSI report. If the CSI report is an exploration report, the base station 110 may adapt a rank or precoder based at least in part on an information that an inactive rank or precoder may be preferred (e.g., better measurements, better conditions) over an existing (active) rank or precoder. In some aspects, the base station 110 may fall back to a previous CSI report if information in the exploration report does not indicate that an inactive rank or precoder is preferred over an existing rank or precoder. The base station 110 may transmit an indication of an aperiodic CSI reporting opportunity for a CSI report to which the base station 110 may fall back. In some aspects, the base station 110 may indicate to the UE 120 to reduce exploration of the one or more inactive ranks or inactive precoders based at least in part on a measurement associated with using an inactive rank or an inactive precoder. This may include switching to a grant that is based at least in part on a fallback CSI report, based at least in part on a measurement associated with a grant that uses a rank or precoder indicated in an exploration-based report (e.g., a CSI report that indicates explored inactive ranks or precoders).

As shown by reference number 330, the base station 110 may transmit the grant to the UE 120. The UE 120 may transmit or receive a communication using the grant, as shown by reference number 335, which may have a new rank or a new precoder. The base station 110 may switch to a new rank or a new precoder based at least in part on the exploration-based report. The UE 120 may process the reference signal or the communication using the new rank or the new precoder. The rank may be new and the precoder may be unchanged; the rank may be unchanged and the precoder may be new; both the rank and the precoder may be new; or both the rank and the precoder may be unchanged.

As indicated above, FIG. 3 is provided as an example. Other examples may differ from what is described with respect to FIG. 3.

Figure 4:
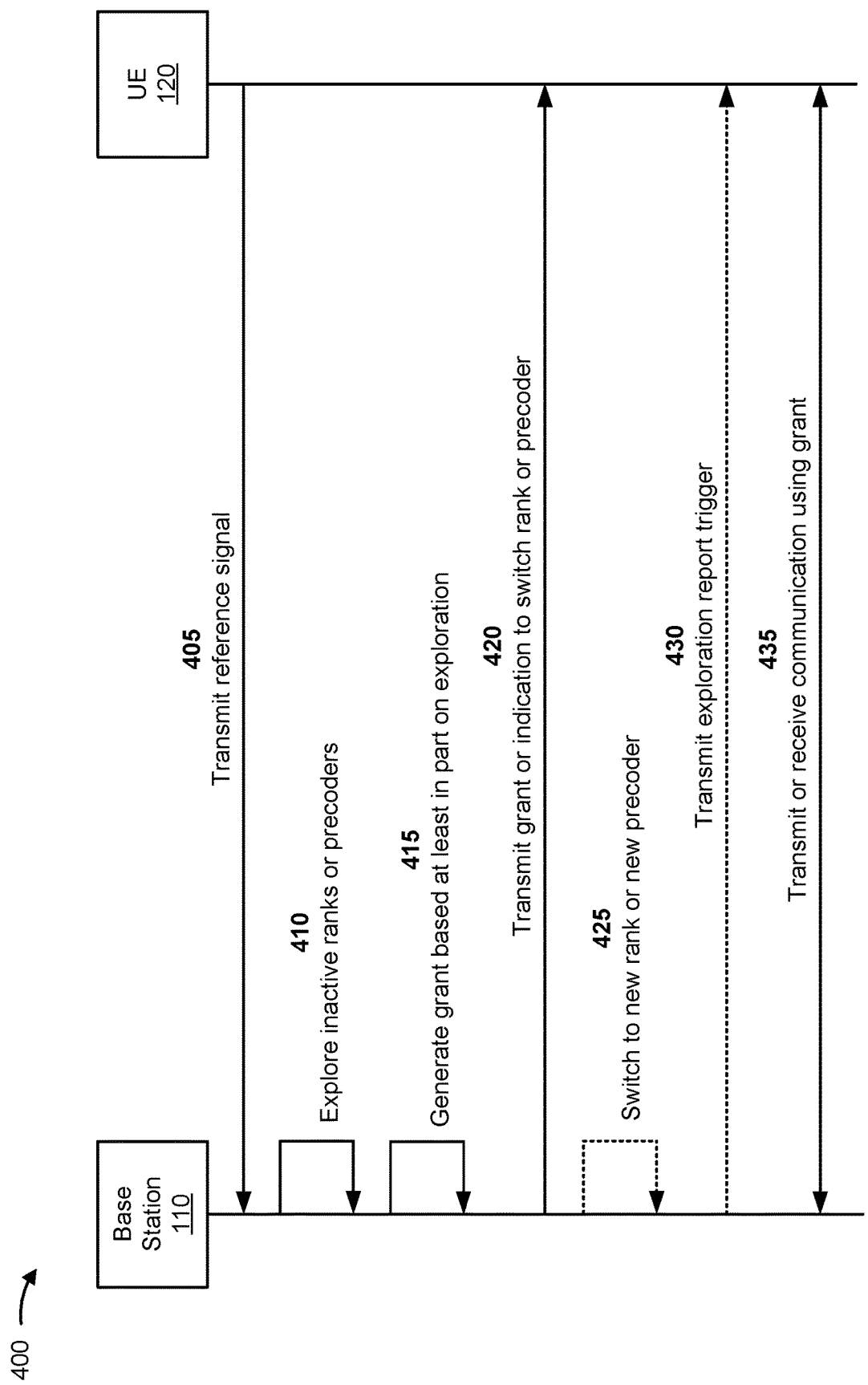
FIG. 4 is a diagram illustrating another example of CSI reporting, in accordance with the present disclosure.

FIG. 4 is a diagram illustrating another example 400 of CSI reporting, in accordance with the present disclosure. Example 400 is similar to example 300, except that the base station 110 is measuring a reference signal from the UE 120, in order to explore the inactive ranks or inactive precoders.

As shown by reference number 405, the UE 120 may transmit a reference signal (e.g., sounding reference signal (SRS)) to the base station 110. As shown by reference number 410, the base station 110 may measure the signal to explore inactive ranks or precoders. Similar to what is performed by UE 120, this may involve measuring the signal for the inactive ranks or precoders and comparing such measurements to historical measurements or measurements of other ranks or precoders.

As shown by reference number 415, the base station 110 may generate a grant based at least in part on the exploration of the inactive ranks or precoders. The base station 110 may adapt a rank or precoder based at least in part on an information that an inactive rank or precoder may be preferred over an existing or active rank or precoder. As shown by reference number 420, the base station 110 may transmit the grant to the UE 120 or transmit an indication to switch to a new rank or a new precoder. The indication may be in the grant, with the grant, or separate from the grant. The UE 120 may use the indication regarding rank or precoder, which may be based at least in part on a CSI report, to demodulate a grant received from the base station 110. As shown by reference number 425, the base station 110 may switch to the new rank or the new precoder, if applicable.

In some aspects, as shown by reference number 430, the base station 110 may transmit an exploration report trigger to the UE 120 based at least in part on a result of the exploration by the base station 110. As shown by reference number 435, the base station 110 may transmit or receive a communication using the existing rank or precoder, a new rank or precoder, or a combination thereof. By exploring and using a rank or precoder that was long inactive but more efficient, the UE and the base station may improve spectral efficiency and throughput.

As indicated above, FIG. 4 is provided as an example. Other examples may differ from what is described with respect to FIG. 4.

Figure 5:
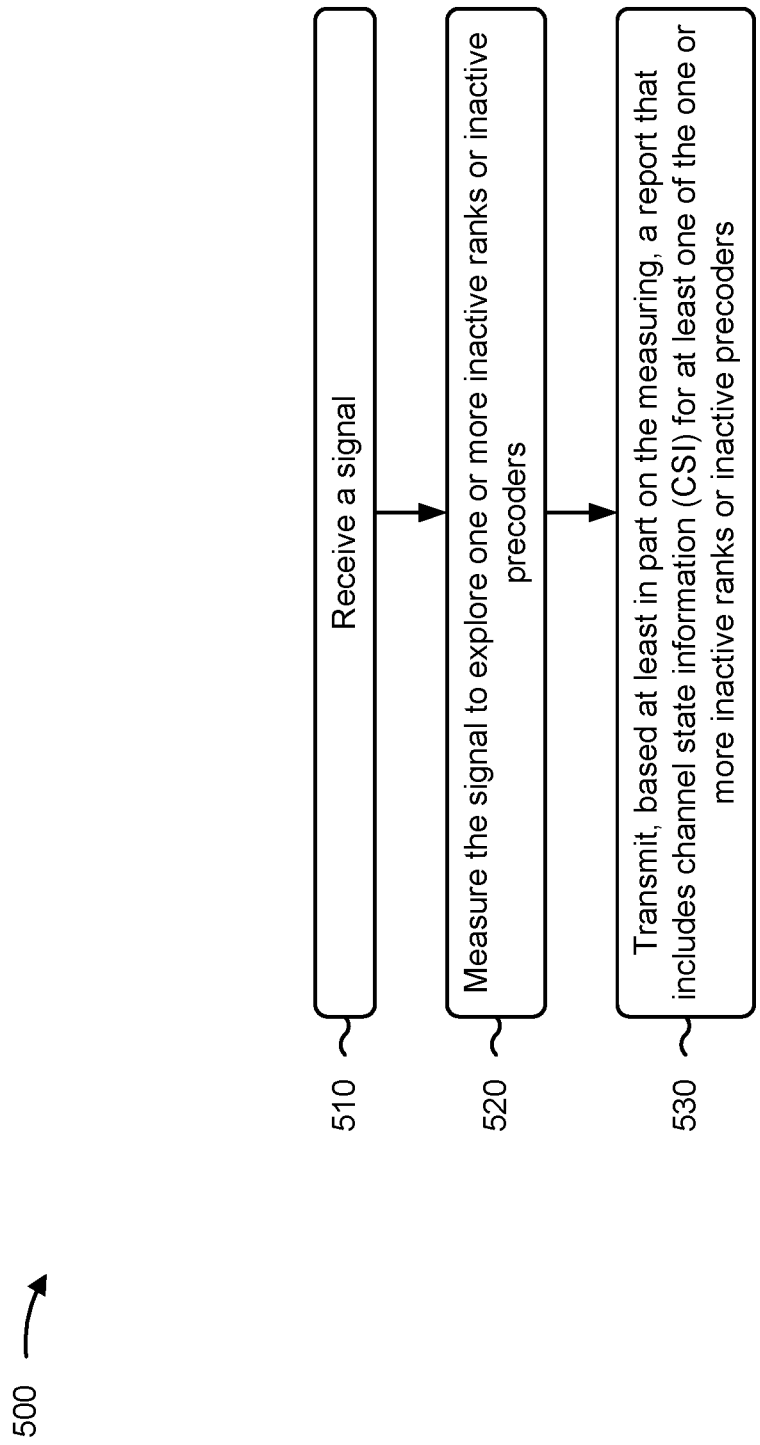
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with exploring inactive ranks or inactive precoders.

As shown in FIG. 5, in some aspects, process 500 may include receiving a signal (block 510). For example, the UE (e.g., using communication manager 140 and/or reception component 802 depicted in FIG. 8) may receive a signal, as described above.

As further shown in FIG. 5, in some aspects, process 500 may include measuring the signal to explore one or more inactive ranks or inactive precoders (block 520). For example, the UE (e.g., using communication manager 140 and/or measurement component 808 depicted in FIG. 8) may measure the signal to explore one or more inactive ranks or inactive precoders, as described above.

As further shown in FIG. 5, in some aspects, process 500 may include transmitting, based at least in part on the measuring, a report that includes CSI for at least one of the one or more inactive ranks or inactive precoders (block 530). For example, the UE (e.g., using communication manager 140 and/or transmission component 804 depicted in FIG. 8) may transmit, based at least in part on the measuring, a report that includes CSI for at least one of the one or more inactive ranks or inactive precoders, as described above. In some aspects, the at least one inactive rank or inactive precoder (selected for exploration) can be a suboptimal rank or a suboptimal precoder. In some aspects, the at least one inactive rank or inactive precoder (selected for exploration) has not been selected within a threshold time duration.

Process 500 may include additional aspects, such as any single aspect or any combination of aspects described below and/or in connection with one or more other processes described elsewhere herein.

In a first aspect, process 500 includes receiving an indication to switch to a new rank or a new precoder of the one or more inactive ranks or inactive precoders and processing the signal or a new signal using the new rank or the new precoder. Processing the signal or the new signal may include processing a granted physical downlink shared channel (PDSCH) transport block using the indicated rank and precoder.

In a second aspect, alone or in combination with the first aspect, the report indicates that the CSI is for inactive ranks or inactive precoders explored by the UE.

In a third aspect, alone or in combination with one or more of the first and second aspects, process 500 includes receiving an indication to explore the one or more inactive ranks or inactive precoders.

In a fourth aspect, alone or in combination with one or more of the first through third aspects, the indication indicates a resource for transmitting the report.

In a fifth aspect, alone or in combination with one or more of the first through fourth aspects, the report includes a separate fallback CSI report.

In a sixth aspect, alone or in combination with one or more of the first through fifth aspects, process 500 includes receiving an indication to reduce exploration of the one or more inactive ranks or inactive precoders.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
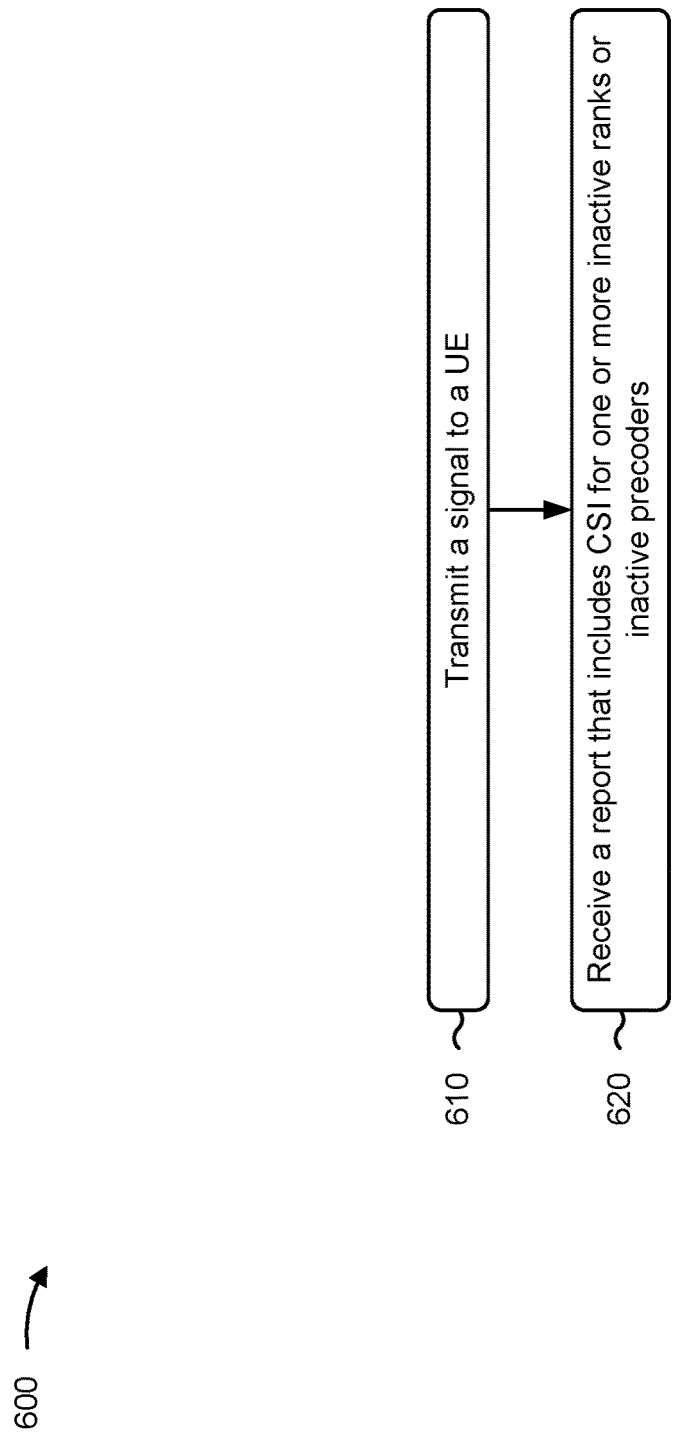
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110) performs operations associated with exploring inactive ranks or inactive precoders.

As shown in FIG. 6, in some aspects, process 600 may include transmitting a signal to a UE (block 610). For example, the base station (e.g., using communication manager 150 and/or transmission component 904 depicted in FIG. 9) may transmit a signal to a UE, as described above.

As further shown in FIG. 6, in some aspects, process 600 may include receiving a report that includes CSI for one or more inactive ranks or inactive precoders (block 620). For example, the base station (e.g., using communication manager 150 and/or reception component 902 depicted in FIG. 9) may receive a report that includes CSI for one or more inactive ranks or inactive precoders, as described above.

Process 600 may include additional aspects, such as any single aspect or any combination of aspects described below and/or in connection with one or more other processes described elsewhere herein.

In a first aspect, the report indicates that the CSI is for inactive ranks or inactive precoders explored by the UE.

In a second aspect, alone or in combination with the first aspect, process 600 includes switching to a new rank or a new precoder based at least in part on the report, and transmitting, to the UE, an indication to switch to the new rank or the new precoder. In some aspects, the new rank or the new precoder may be suboptimal. In some aspects, the new rank or the new precoder has not been selected within a threshold time duration.

In a third aspect, alone or in combination with one or more of the first and second aspects, process 600 includes falling back to a previous CSI report.

In a fourth aspect, alone or in combination with one or more of the first through third aspects, process 600 includes transmitting an indication to explore the one or more inactive ranks or inactive precoders that can be suboptimal or that have not been selected within a threshold time duration.

In a fifth aspect, alone or in combination with one or more of the first through fourth aspects, the indication indicates a resource for transmitting the (exploration-based) report.

In a sixth aspect, alone or in combination with one or more of the first through fifth aspects, process 600 includes transmitting, to the UE, an indication to provide a separate fallback CSI report, and the report includes the separate fallback CSI report.

In a seventh aspect, alone or in combination with one or more of the first through sixth aspects, process 600 includes transmitting an indication to reduce exploration of the one or more inactive ranks or inactive precoders based at least in part on a measurement associated with using an inactive rank or an inactive precoder indicated in an exploration-based CSI report.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
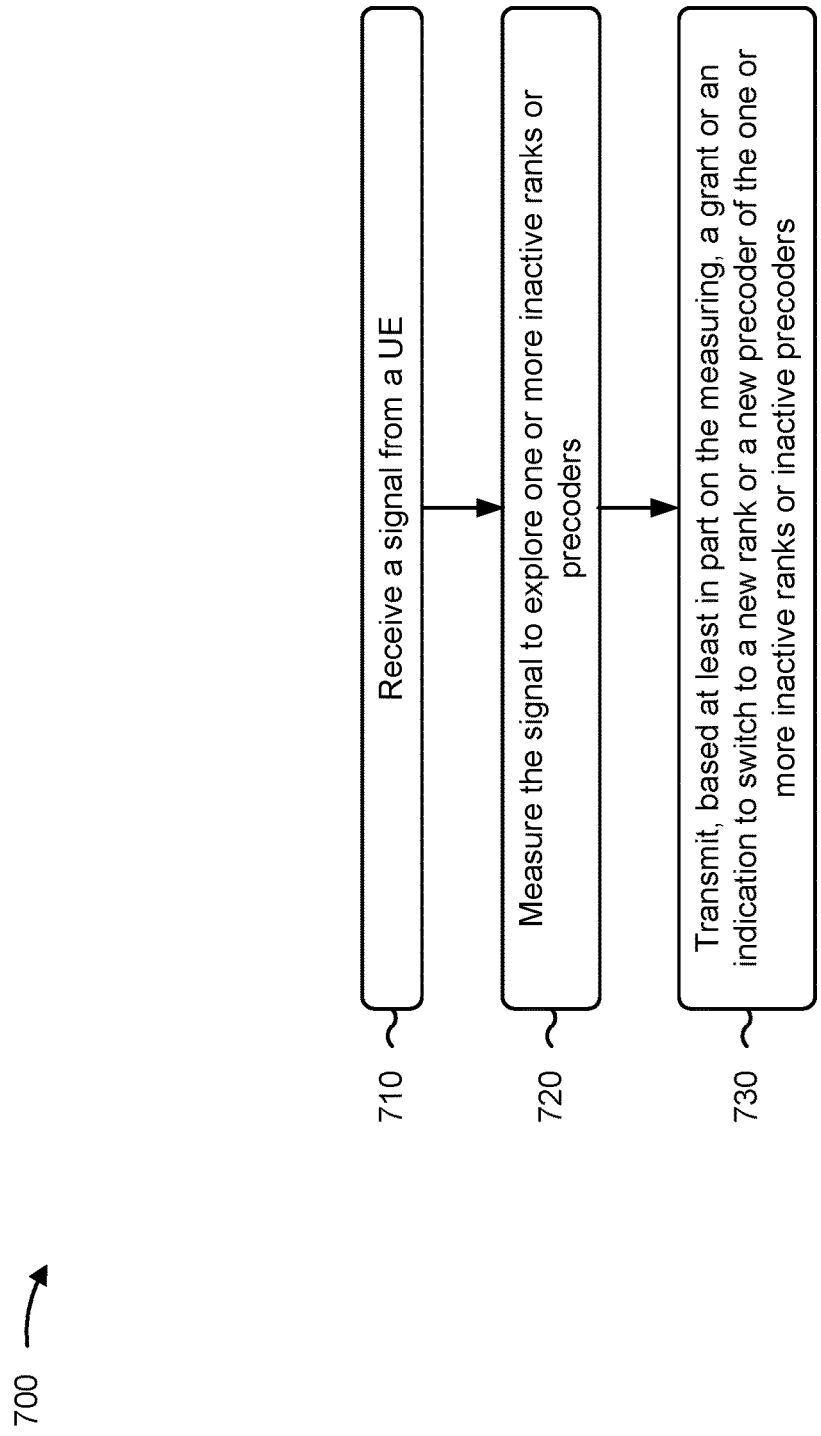
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with exploring inactive ranks or inactive precoders.

As shown in FIG. 7, in some aspects, process 700 may include receiving a signal from a UE (block 710). For example, the base station (e.g., using communication manager 150 and/or reception component 902 depicted in FIG. 9) may receive a signal from a UE, as described above.

As further shown in FIG. 7, in some aspects, process 700 may include measuring the signal to explore one or more inactive ranks or inactive precoders (block 720). For example, the base station (e.g., using communication manager 150 and/or measurement component 910 depicted in FIG. 9) may measure the signal to explore one or more inactive ranks or inactive precoders, as described above.

As further shown in FIG. 7, in some aspects, process 700 may include transmitting, based at least in part on the measuring, a grant or an indication to switch to a new rank or a new precoder of the one or more inactive ranks or inactive precoders (block 730). For example, the base station (e.g., using communication manager 150 and/or transmission component 904 depicted in FIG. 9) may transmit, based at least in part on a measurement of the signal, a grant or an indication to switch to a new rank or a new precoder of the one or more inactive ranks or inactive precoders, as described above. In some aspects, the new rank or the new precoder may be suboptimal. In some aspects, the new rank or the new precoder has not been selected within a threshold time duration.

Process 700 may include additional aspects, such as any single aspect or any combination of aspects described below and/or in connection with one or more other processes described elsewhere herein.

In a first aspect, process 700 includes transmitting, to the UE based at least in part on the measuring, an indication to explore the one or more inactive ranks or inactive precoders.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
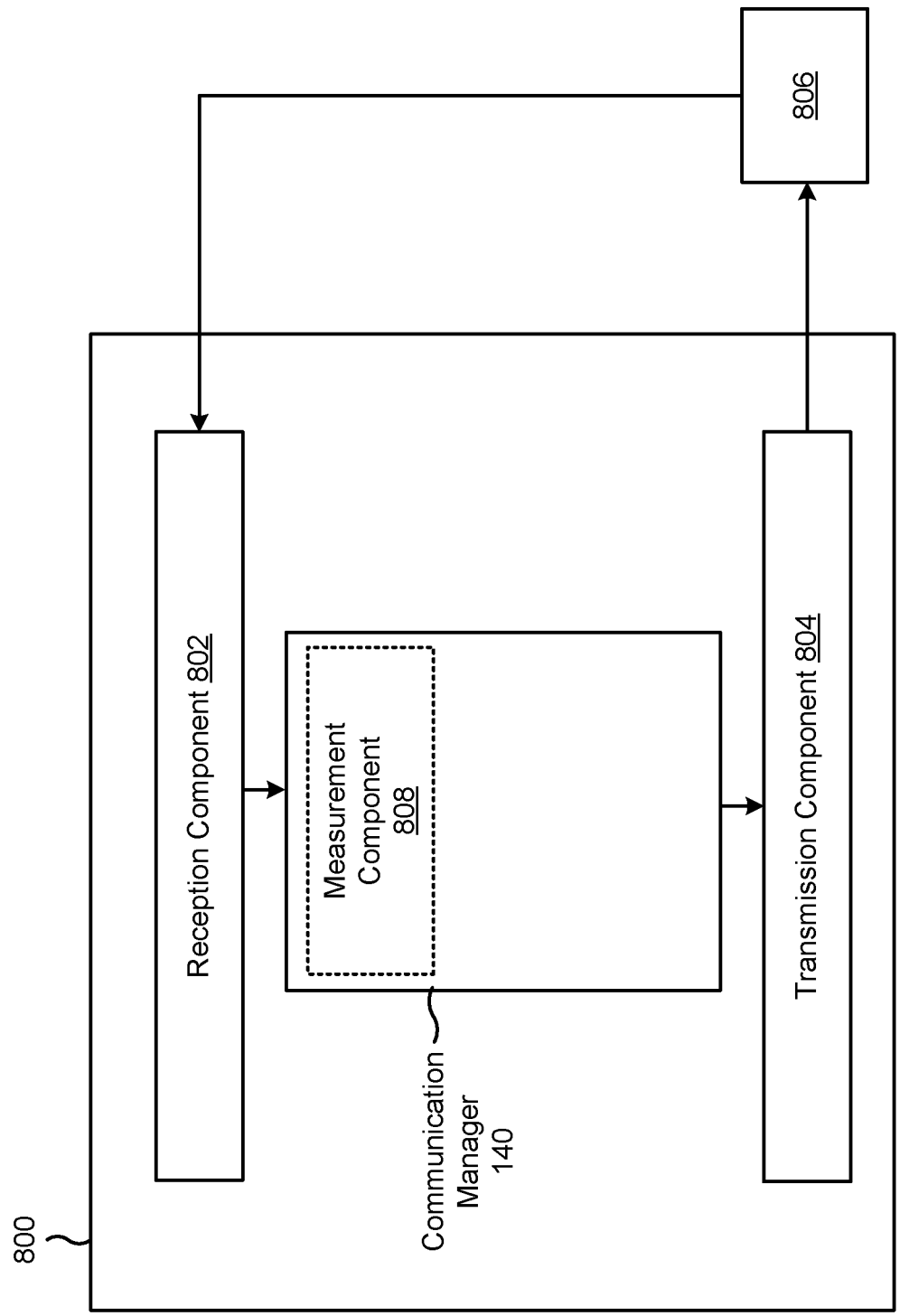
FIGS. 8-9 are diagrams of example apparatuses for wireless communication, in accordance with the present disclosure.

FIG. 8 is a diagram of an example apparatus 800 for wireless communication. The apparatus 800 may be a UE (e.g., a UE 120), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a measurement component 808, among other examples.

In some aspects, the apparatus 800 may be configured to perform one or more operations described herein in connection with FIGS. 1-4. Additionally, or alternatively, the apparatus 800 may be configured to perform one or more processes described herein, such as process 500 of FIG. 5. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a signal. The measurement component 808 may measure the signal to explore one or more inactive ranks or inactive precoders. The transmission component 804 may transmit, based at least in part on the measuring, a report that includes CSI for at least one of the one or more inactive ranks or inactive precoders.

The reception component 802 may receive an indication to switch to a new rank or a new precoder of the one or more inactive ranks or inactive precoders. The reception component 802 may process the signal or a new signal using the new rank or the new precoder.

The reception component 802 may receive an indication to explore the one or more inactive ranks or inactive precoders. The reception component 802 may receive an indication to reduce exploration of the one or more inactive ranks or inactive precoders.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
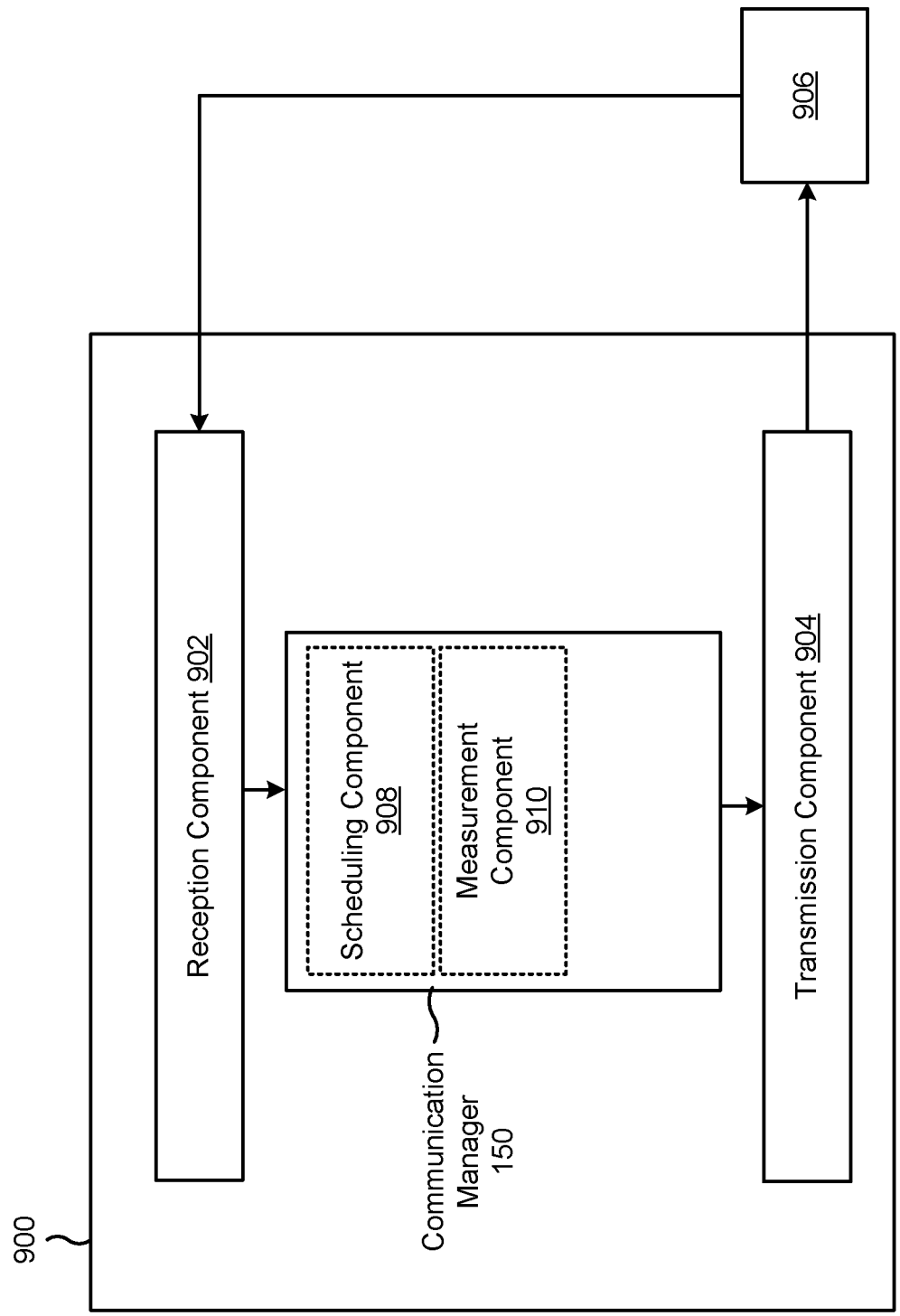

FIG. 9 is a diagram of an example apparatus 900 for wireless communication. The apparatus 900 may be a base station (e.g., base station 110), or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a scheduling component 908 and/or a measurement component 910, among other examples.

In some aspects, the apparatus 900 may be configured to perform one or more operations described herein in connection with FIGS. 1-4. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit a signal to a UE. The reception component 902 may receive a report that includes CSI for the signal for one or more inactive ranks or inactive precoders.

The reception component 902 and the transmission component 904 may switch to a new rank or a new precoder based at least in part on the report. The transmission component 904 may transmit, to the UE, an indication to switch to the new rank or the new precoder. The scheduling component 908 may generate the indication and/or a grant for the UE. The scheduling component 908 may fall back to a previous CSI report.

The transmission component 904 may transmit an indication to explore the one or more inactive ranks or inactive precoders.

The transmission component 904 may transmit an indication to reduce exploration of the one or more inactive ranks or inactive precoders based at least in part on a measurement associated with using an inactive rank or an inactive precoder.

In some aspects, the reception component 902 may receive a signal from a UE. The measurement component 910 may measure the signal to explore one or more inactive ranks or inactive precoders. The transmission component 904 may transmit, based at least in part on the measuring, a grant or an indication to switch to a new rank or a new precoder of the one or more inactive ranks or inactive precoders.

The transmission component 904 may transmit, to the UE based at least in part on the measuring, an indication to explore the one or more inactive ranks or inactive precoders.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a signal; measuring the signal to explore one or more inactive ranks or inactive precoders; and transmitting, based at least in part on the measuring, a report that includes channel state information (CSI) for at least one of the one or more inactive ranks or inactive precoders.

Aspect 2: The method of Aspect 1, further comprising: receiving an indication to switch to a new rank or a new precoder of the one or more inactive ranks or inactive precoders; and processing the signal or a new signal using the new rank or the new precoder.

Aspect 3: The method of Aspect 1 or 2, wherein the report indicates that the CSI is for inactive ranks or inactive precoders explored by the UE.

Aspect 4: The method of any of Aspects 1-3, further comprising receiving an indication to explore the one or more inactive ranks or inactive precoders explored by the UE.

Aspect 5: The method of Aspect 4, wherein the indication indicates a resource for transmitting the report.

Aspect 6: The method of any of Aspects 1-5, wherein the report includes a separate fallback CSI report.

Aspect 7: The method of any of Aspects 1-6, further comprising receiving an indication to reduce exploration of the one or more inactive ranks or inactive precoders.

Aspect 8: The method of any of Aspects 1-7, wherein the at least one inactive rank or inactive precoder is selected for exploration and can be a suboptimal rank or a suboptimal precoder.

Aspect 9: The method of any of Aspects 1-8, wherein the at least one inactive rank or inactive precoder selected for exploration has not been selected within a threshold time duration.

Aspect 10: A method of wireless communication performed by a base station, comprising: transmitting, to a user equipment (UE), a signal; and receiving a report that includes channel state information (CSI) for one or more inactive ranks or inactive precoders.

Aspect 11: The method of Aspect 10, wherein the report indicates that the CSI is for exploration of inactive ranks or inactive precoders explored by the UE.

Aspect 12: The method of Aspect 10 or 11, further comprising: switching to a new rank or a new precoder based at least in part on the report; and transmitting, to the UE, an indication to switch to the new rank or the new precoder.

Aspect 13: The method of any of Aspects 10-12, further comprising falling back to a previous CSI report.

Aspect 14: The method of any of Aspects 10-13, further comprising transmitting an indication to explore the one or more inactive ranks or inactive precoders that can be suboptimal or that have not been selected within a threshold time duration.

Aspect 15: The method of Aspect 14, wherein the indication indicates a resource for transmitting the report.

Aspect 16: The method of any of Aspects 10-15, further comprising transmitting, to the UE, an indication to provide a separate fallback CSI report, wherein the report includes a separate fallback CSI report.

Aspect 17: The method of any of Aspects 10-16, further comprising transmitting an indication to reduce exploration of the one or more inactive ranks or inactive precoders based at least in part on a measurement associated with using an inactive rank or an inactive precoder indicated in an exploration-based CSI report.

Aspect 18: A method of wireless communication performed by a base station, comprising: receiving, from a user equipment (UE), a signal; measuring the signal to explore one or more inactive ranks or precoders; and transmitting, based at least in part on the measuring, a grant or an indication to switch to a new rank or a new precoder of the one or more inactive ranks or inactive precoders.

Aspect 19: The method of Aspect 18, further comprising transmitting, to the UE based at least in part on the measuring, an indication to explore the one or more inactive ranks or inactive precoders.

Aspect 20: The method of Aspect 18 or 19, wherein the new rank can be a suboptimal rank or the new precoder can be a suboptimal precoder.

Aspect 21: The method of any of Aspects 18-20, wherein the new rank or the new precoder has not been selected within a threshold time duration.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
   receive a signal;
   measure the signal to explore one or more inactive precoders; and
   transmit, based at least in part on measuring the signal, a report that includes channel state information (CSI) for at least one inactive precoder of the one or more inactive precoders.

2. The UE of claim 1, wherein the one or more processors are further configured to:
   receive an indication to switch to a new precoder of the one or more inactive precoders; and
   process the signal or a new signal using the new precoder.

3. The UE of claim 1, wherein the report indicates that the CSI is for inactive precoders explored by the UE.

4. The UE of claim 1, wherein the one or more processors are further configured to receive an indication to explore the one or more inactive precoders.

5. The UE of claim 4, wherein the indication indicates a resource for transmitting the report.

6. The UE of claim 1, wherein the report includes a separate fallback CSI report.

7. The UE of claim 1, wherein the at least one inactive precoder is selected for exploration and is a suboptimal precoder.

8. The UE of claim 1, wherein the at least one inactive precoder is selected for exploration and has not been selected within a threshold time duration.

9. A network entity for wireless communication, comprising:
   one or more memories; and
   one or more processors, coupled to the one or more memories, configured to:
   transmit a signal to a user equipment (UE); and
   receive a report that includes channel state information (CSI) for one or more inactive precoders.

10. The network entity of claim 9, wherein the report indicates that the CSI is for inactive precoders explored by the UE.

11. The network entity of claim 9, wherein the one or more processors are further configured to:
    switch to a new precoder based at least in part on the report; and
    transmit, to the UE, an indication to switch to the new precoder.

12. The network entity of claim 9, wherein the one or more processors are further configured to fall back to a previous CSI report.

13. The network entity of claim 9, wherein the one or more processors are further configured to transmit an indication to explore inactive precoders that can be suboptimal or that have not been selected within a threshold time duration.

14. The network entity of claim 13, wherein the indication indicates a separate resource for transmitting the report.

15. The network entity of claim 9, wherein the one or more processors are further configured to transmit, to the UE, an indication to provide a separate fallback CSI report, and wherein the report includes the separate fallback CSI report.

16. The network entity of claim 9, wherein the one or more processors are further configured to transmit an indication to reduce exploration of the one or more inactive precoders based at least in part on a measurement associated with using an inactive precoder indicated in an exploration-based CSI report.

17. A network entity for wireless communication, comprising:
    one or more memories; and
    one or more processors, coupled to the one or more memories, configured to:
    receive a signal from a user equipment (UE);
    measure the signal to explore one or more inactive precoders; and
    transmit, based at least in part on a measurement of the signal, a grant or an indication to switch to a new precoder of the one or more inactive precoders.

18. The network entity of claim 17, wherein the one or more processors are further configured to transmit, to the UE and based at least in part on the measurement, an indication to explore the one or more inactive precoders.

19. The network entity of claim 17, wherein the new precoder is a suboptimal precoder.

20. The network entity of claim 17, wherein the new precoder has not been selected within a threshold time duration.

21. A method of wireless communication performed by a user equipment (UE), comprising:
   receiving a signal;
   measuring the signal to explore one or more inactive precoders; and
   transmitting, based at least in part on the measuring, a report that includes channel state information (CSI) for at least one inactive precoder of the one or more inactive precoders.

22. The method of claim 21, further comprising:
   receiving an indication to switch to a new precoder of the one or more inactive precoders; and
   processing the signal or a new signal using the new precoder.

23. The method of claim 21, wherein the report indicates that the CSI is for inactive precoders explored by the UE.

24. The method of claim 21, further comprising receiving an indication to explore the one or more inactive precoders.

25. The method of claim 24, wherein the indication indicates a resource for transmitting the report.

26. The method of claim 21, wherein the report includes a separate fallback CSI report.

27. The method of claim 21, further comprising receiving an indication to reduce exploration of the one or more inactive precoders.

28. The method of claim 21, wherein the at least one inactive precoder is selected for exploration and is a suboptimal precoder.

29. The method of claim 21, wherein the at least one inactive precoder is selected for exploration and has not been selected within a threshold time duration.

* * * * *